United States Patent
Grzyb et al.

(10) Patent No.: US 9,488,406 B2
(45) Date of Patent: Nov. 8, 2016

(54) REFRIGERATOR DISPENSER AND METHOD OF ILLUMINATING THE DISPENSER

(71) Applicant: Whirlpool Corporation, Benton Harbor, MI (US)

(72) Inventors: Piotr Jozef Grzyb, Wroclaw (PL); Vijay Shahaji Pawar, Faridabad (IN); Kunal A. Shambharkar, Pune (IN)

(73) Assignee: Whirlpool Corporation, Benton Harbor, MI (US)

(*) Notice: Subject to any disclaimer, the term of this patent is extended or adjusted under 35 U.S.C. 154(b) by 0 days.

(21) Appl. No.: 14/598,780

(22) Filed: Jan. 16, 2015

(65) Prior Publication Data

US 2016/0209105 A1    Jul. 21, 2016

(51) Int. Cl.
| | |
|---|---|
| *F21V 33/00* | (2006.01) |
| *F25D 23/12* | (2006.01) |
| *F25D 23/04* | (2006.01) |
| *F25D 27/00* | (2006.01) |
| *F21V 8/00* | (2006.01) |
| *F21W 131/305* | (2006.01) |

(52) U.S. Cl.
CPC ......... *F25D 23/126* (2013.01); *F21V 33/0012* (2013.01); *F25D 23/04* (2013.01); *F25D 27/00* (2013.01); *G02B 6/0001* (2013.01); *F21W 2131/305* (2013.01); *F25D 2327/001* (2013.01)

(58) Field of Classification Search
CPC . F21D 27/00; G02B 6/0001; F21V 33/0012; F25D 2327/001; F21W 2131/305
See application file for complete search history.

(56) References Cited

U.S. PATENT DOCUMENTS

| | | |
|---|---|---|
| 4,706,169 A | 11/1987 | Bussan et al. |
| 5,463,877 A | 11/1995 | Young et al. |
| 5,701,235 A | 12/1997 | Cook et al. |
| 6,804,974 B1 | 10/2004 | Voglewede et al. |
| 7,040,110 B2 | 5/2006 | Nowak |
| 7,568,358 B2 | 8/2009 | Wetekamp |
| 7,617,698 B2 | 11/2009 | Bowen et al. |
| 7,832,224 B2 | 11/2010 | Roo et al. |
| 7,921,658 B2 | 4/2011 | Wetekamp |
| 8,109,301 B1 | 2/2012 | Denise |
| 8,333,084 B2 | 12/2012 | Park |
| 8,505,593 B1 | 8/2013 | Denise |
| 8,590,745 B2 | 11/2013 | Filho et al. |
| 8,827,477 B2 | 9/2014 | Doering et al. |
| 2008/0163641 A1 | 7/2008 | Mitchell |
| 2009/0090120 A1 | 4/2009 | Roo et al. |
| 2011/0139817 A1 | 6/2011 | Lu et al. |
| 2011/0174008 A1 | 7/2011 | Kim |
| 2012/0031124 A1 | 2/2012 | McDaniel |
| 2012/0103000 A1 | 5/2012 | Krause et al. |
| 2012/0103001 A1 | 5/2012 | Krause et al. |

*Primary Examiner* — Thomas M Sember

(57) ABSTRACT

A refrigerator dispenser includes a housing assembly having a fascia and a spout, the spout being located so that a dispensed substance passes through the spout when the dispenser is activated. The dispenser also includes a printed circuit board coupled to the housing assembly and a plurality of light sources coupled to the printed circuit board. A plurality of light guides is located adjacent to the plurality of light sources, the plurality of light guides being configured to be illuminated by the plurality of light sources. A rear wall, bottom wall and sidewalls of the dispenser define a dispensing area, and the plurality of light guides provides illumination to the dispensing area.

20 Claims, 6 Drawing Sheets

REFRIGERATOR DISPENSER AND METHOD OF ILLUMINATING THE DISPENSER

BACKGROUND OF THE INVENTION

The present invention pertains to a dispenser for a refrigerator and, more particularly, to illuminating the dispenser.

In a typical refrigerator, a light source is provided within the fresh food compartment so that a user is able to view the contents of the compartment. In addition, if the refrigerator includes a dispenser, a light source can be provided to illuminate the dispenser area. Such a dispenser is usually located in a door of the refrigerator and dispense water or ice. By providing a light source for the dispenser, a user is able to properly position a container near the dispenser, even under low light conditions. However, there are certain difficulties involved when a light source is placed near the dispenser. Specifically, the light source, and any associated electronics, must be kept dry despite the presence of water in and around the dispenser. Additionally, as the light source may be visible even when the refrigerator door is closed, it is important that the light source be aesthetically pleasing. Furthermore, it is beneficial for the light source to be compact and simple to install. Therefore, there is a need in the art for an illuminated refrigerator dispenser where the dispenser's light source and associated electronics are isolated from dispensed liquids, aesthetically pleasing, compact and simple to install.

SUMMARY OF THE INVENTION

The present invention is directed to a dispenser of a refrigerator. The dispenser includes a housing assembly having a fascia and a spout, the spout being located so that a dispensed substance passes through the spout when the dispenser is activated. A printed circuit board is coupled to the housing assembly, and a plurality of light sources are coupled to the printed circuit board. Also, a plurality of light guides are located adjacent to the plurality of light sources and configured to be illuminated by the plurality of light sources. A rear wall, a bottom wall and sidewalls of the dispenser define a dispensing area, and the plurality of light guides provides illumination to the dispensing area.

The printed circuit board is located behind the fascia so that the printed circuit board is not visible to a user of the refrigerator. In one embodiment, the printed circuit board is coupled to an upper portion of the spout. Additionally, the fascia is directly coupled to the spout and includes a first light guide hole, while the spout includes a second light guide hole. At least one of the plurality of light guides passes through both the first and second light guide holes.

In another embodiment, at least one of the plurality of light guides constitutes a first light guide, with the first light guide being coupled to the spout. The first light guide extends from a top of the spout to the bottom of the spout, with a front face of the first light guide visible to a user of the refrigerator. Another one of the plurality of light guides constitutes a second light guide that is coupled to the fascia. Preferably, the fascia includes a light guide hole and the second light guide is located in the light guide hole so that, when the second light guide is illuminated, light is emitted in a downward direction from the fascia into the dispensing area.

Additional objects, features and advantages of the present invention will become more readily apparent from the following detail description of preferred embodiments when taken in conjunction with the drawings wherein like reference numerals refer to corresponding parts in the several views.

DETAILED DESCRIPTION OF THE PREFERRED EMBODIMENTS

Figure 1:
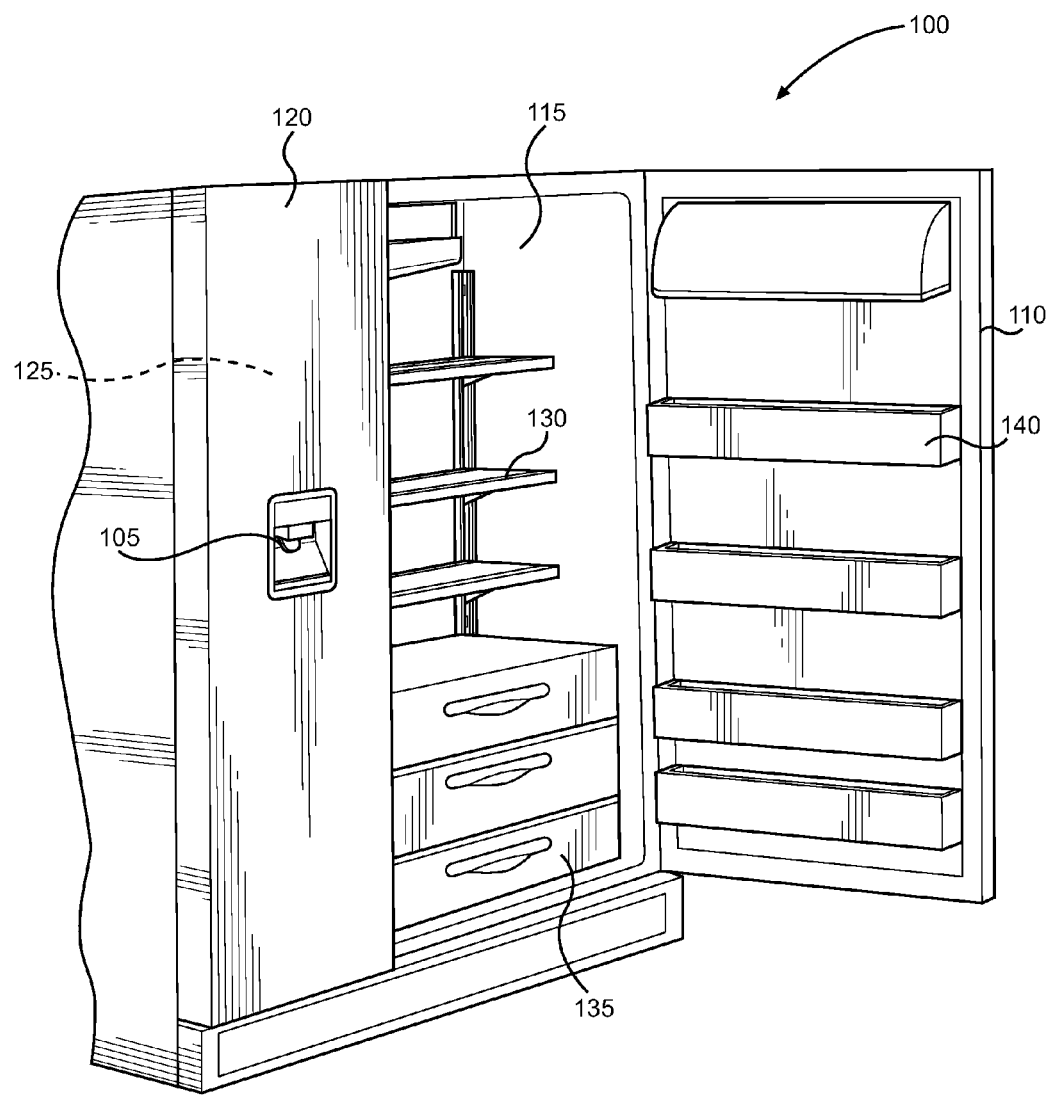
FIGS. 1 is a perspective view of a refrigerator including a dispenser in accordance with the present invention.

With initial reference to FIG. 1, there is illustrated a refrigerator 100 in accordance with the present invention. Refrigerator 100 is shown in a side-by-side configuration, although the present invention can be used with other refrigerator configurations, including French door, bottom mount and top mount refrigerators. Refrigerator 100 includes a dispenser 105, which selectively dispenses ice or water when desired by a user; a fresh food door 110, which seals a fresh food compartment 115; and a freezer door 120, which seals a freezer compartment 125. For completeness, refrigerator 100 also includes a plurality of shelves (one of which is labeled 130), a plurality of drawers (one of which is labeled 135) and a plurality of door bins (one of which is labeled 140). Although not shown, refrigerator 100 includes a refrigeration system that establishes above and below freezing temperatures in compartments 110 and 120.

Figure 2:
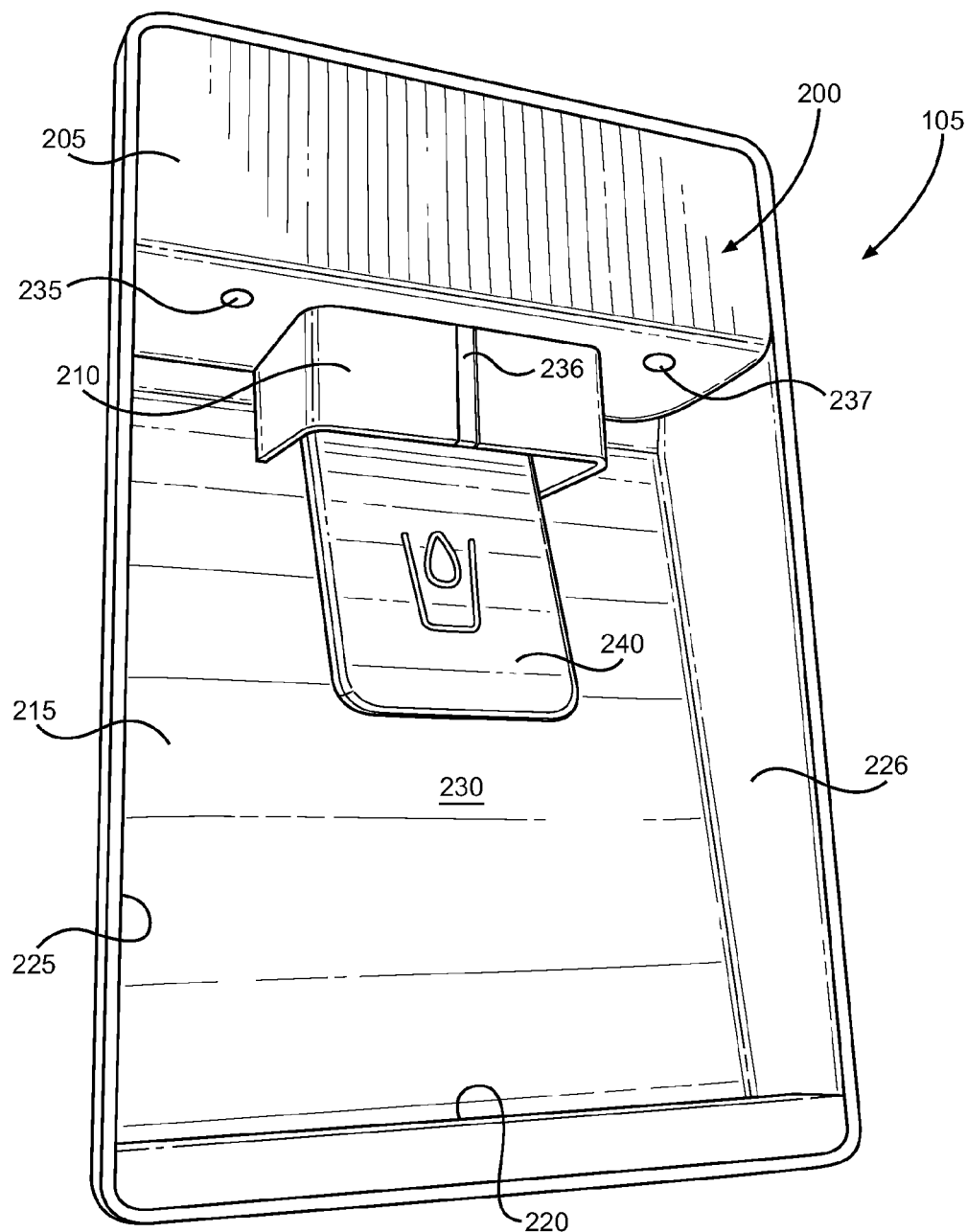
FIG. 2 is an enlarged perspective view of the dispenser of the refrigerator of FIG. 1.

FIG. 2 provides a more detailed view of dispenser 105. Dispenser 105 includes a housing assembly 200 having a fascia 205 and a spout 210. In addition, a rear wall 215, a bottom wall 220 and sidewalls 225 and 226 define a dispensing area 230. A plurality of light guides is provided in order to illuminate dispensing area 230, with a main light guide labeled 236 and auxiliary light guides labeled 235 and 237. Light guides 235-237 are preferably made of a transparent or semi-transparent material, such as polymethylmethacrylate, so that light guides 235-237 can be illuminated by an adjacent light source, as will be described below. Dispenser 105 also includes a means for activating dispenser 105 which, in this embodiment, takes the form of a paddle 240. When paddle 240 is pushed toward rear wall 215, dispenser 105 is activated such that ice or water is selectively dispensed through spout 210. The means for activating dispenser 105 can also include, for example, a button placed near dispenser 105 or a sensor that detects when a container is placed below spout 210.

Figure 3A:
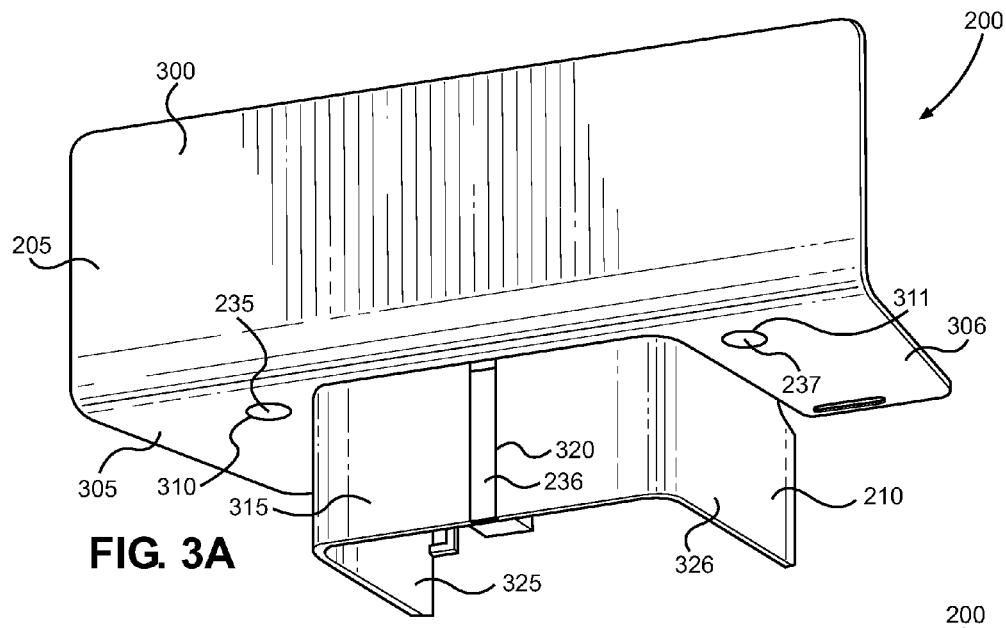
FIG. 3A is a perspective view of a front of a housing assembly of the dispenser.
Figure 3B:
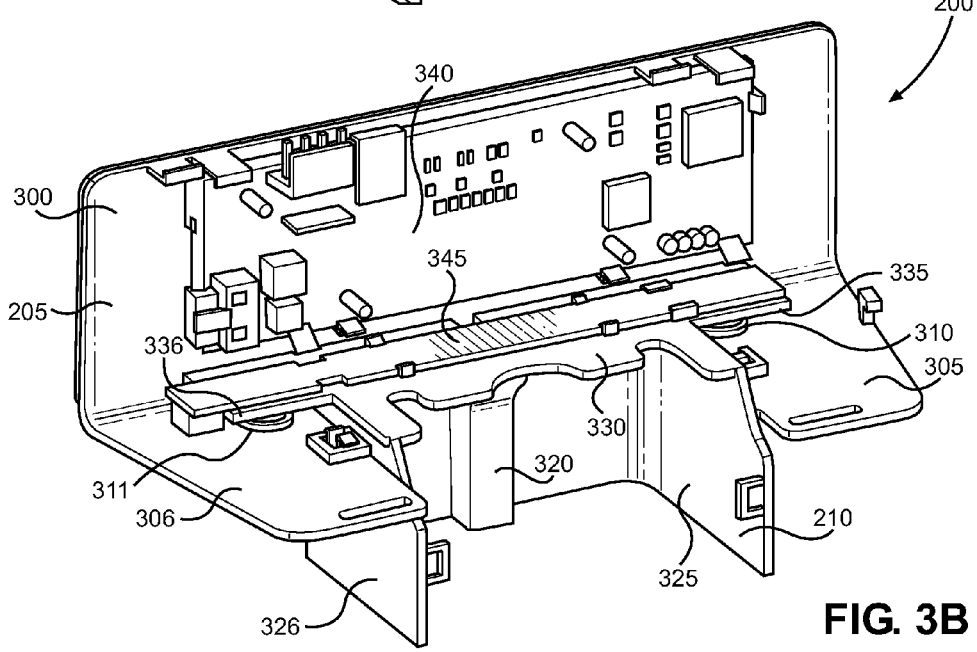
FIG. 3B is a perspective view of a back of the housing assembly.

With reference now to FIGS. 3A and 3B, front and rear perspective views of housing assembly 200 are provided. Fascia 205 includes a front wall 300, two rearwardly extending arms 305 and 306 and two light guide holes 310 and 311 located in arms 305 and 306, respectively. Spout 210 includes a front wall 315, a slot 320 for light guide 236, two sidewalls 325 and 326 and an upper portion 330 having two arms 335 and 336. First and second printed circuit boards (PCBs) 340 and 345 are located behind fascia 205 so that this structure is not visible to a user of dispenser 105. PCB 340 is mounted to front wall 300 and preferably includes a controller (not labeled) for controlling the operation of dispenser 105. On the other hand, PCB 345 is mounted to upper portion 330, and three light-emitting diodes (LEDs), which are not visible in this view, are coupled to PCB 345 for illuminating light guides 235-237 and, correspondingly, dispensing area 230. Although the embodiments described herein involve the use of LEDs, other light sources can be used.

Figure 4A:
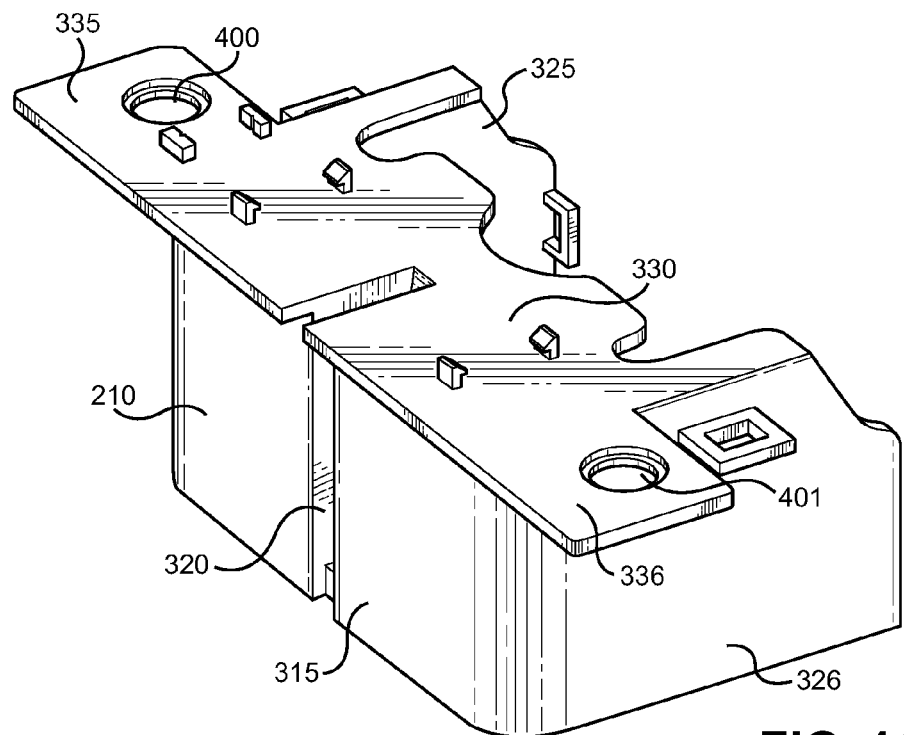
FIG. 4A is a perspective view of a spout of the housing assembly.
Figure 4B:
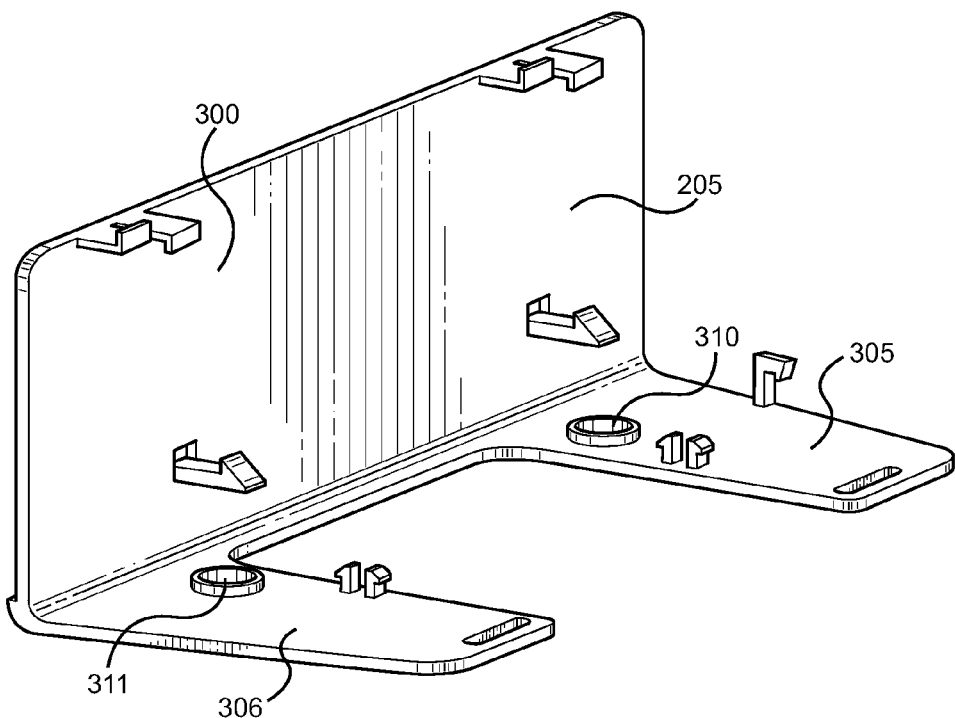
FIG. 4B is a perspective view of a fascia of the housing assembly.

FIGS. 4A and 4B show spout 210 and fascia 205 separated from one another and with PCBs 345 and 340 removed. As a result, light guide holes 400 and 401 of spout 210 are visible. When fascia 205 and spout 210 are directly coupled together, light guide holes 310 and 311 are respectively aligned with light guide holes 400 and 410 so that light guides 235 and 237 extend from fascia 205 to corresponding LEDs coupled or mounted to PCB 345. Additionally, another LED, coupled to PCB 345, is located above slot 320 to illuminate light guide 236 located therein.

Figure 5:
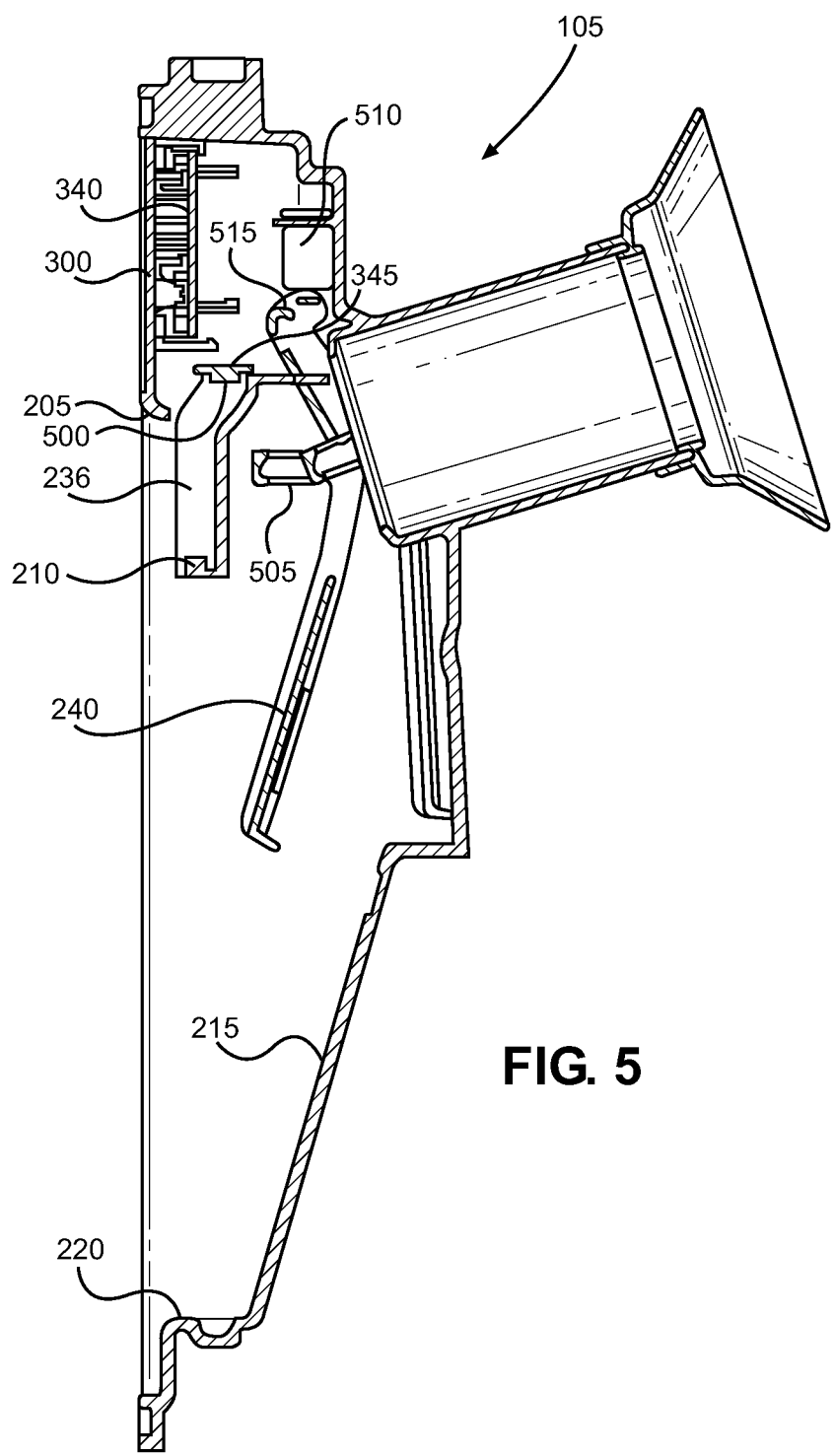
FIG. 5 is a cross section of the dispenser from a side perspective.

Turning to FIG. 5, there is shown a cross section of dispenser 105 from a side perspective. The LED mounted on PCB 345 and associated with light guide 236 is visible in this view and labeled 500. Also, in this embodiment, a nozzle 505 is provided to dispense water, or another liquid, into a container (not shown) located below spout 210. However, in other embodiments, a passageway can also be provided for dispensing ice, with or without the inclusion of nozzle 505. A switch 510 is located behind fascia 205, and an upper portion 515 of paddle 240 is located adjacent to switch 510 so that, when paddle 240 is pushed toward rear wall 215, upper portion 515 activates switch 510. Of course, it should be recognized that other switching arrangements can be used. Additionally, as discussed above, other means of activating dispenser 105 can be provided, with such means including corresponding switching arrangements.

Figure 6A:
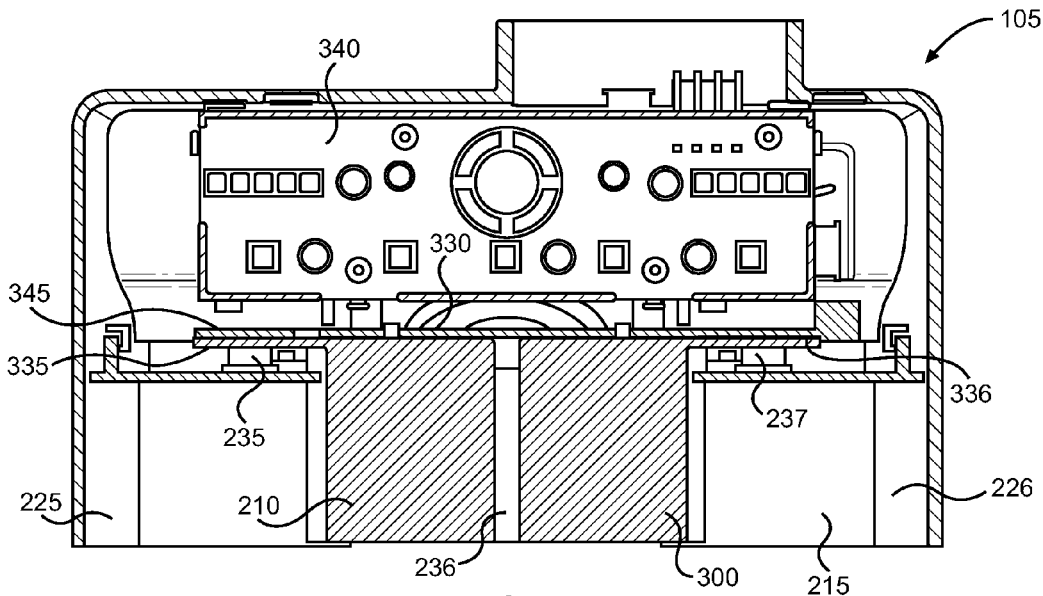
FIG. 6A is a cross section of the dispenser from the front perspective.
Figure 6B:
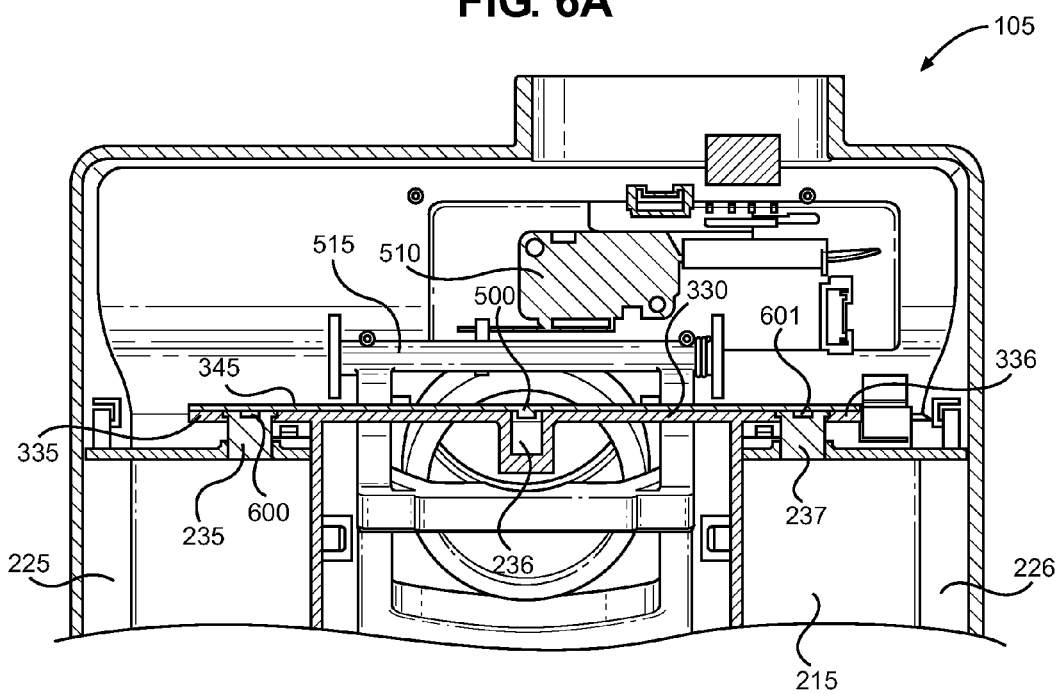
FIG. 6B is a second cross section of the dispenser from the front perspective.

FIGS. 6A and 6B show two cross sections of dispenser 105 from a front perspective, with FIG. 6A representing a shallower cross section than FIG. 6B. In FIG. 6A, front wall 300 of fascia 205 is missing while, in FIG. 6B, PCB 340 and front wall 315 of spout 310 are also missing. As a result, it is possible to clearly see light guides 235-237 in FIGS. 6A and 6B and LEDs 500, 600 and 601 in FIG. 6B. In particular, LEDs 500, 600 and 601 are shown coupled to PCB 345, and light guides 235-237 are shown adjacent to LEDs 500, 600 and 601 such that LEDs 500, 600 and 601 illuminate light guides 235-237 and light guides 235-237 illuminate dispensing area 230. Additionally, it is possible to see light guides 235-237 passing through light guide holes 310, 311, 400 and 401. In the preferred embodiment shown, light guides 235 and 237 are cylindrical in shape and emit light in a downward direction from fascia 205. In contrast, light guide 236 generally conforms to slot 320 and runs in a generally vertical direction (+/−15 degrees) from a top of spout 210 to a bottom of spout 210. Accordingly, light guide 236 emits light both downward and from its front face (which is labeled 605 in FIG. 6A).

Based on the above, it should be readily apparent that the present invention provides a dispenser for a refrigerator where the dispenser's light source and associated electronics are isolated from dispensed liquids, aesthetically pleasing, compact and simple to install. Although described with reference to preferred embodiments, it should be readily understood that various changes or modifications could be made to the invention without departing from the spirit thereof. For example, the number and arrangement of the LEDs can be varied. In general, the invention is only intended to be limited by the scope of the following claims.

The invention claimed is:

1. A refrigerator comprising:
    at least one refrigerated compartment selectively sealed by a door; and
    a dispenser provided in the door, said dispenser including:
        a housing assembly having a fascia and a spout, the spout being located so that a dispensed substance passes through the spout when the dispenser is activated;
        a printed circuit board coupled to the housing assembly;
        a plurality of light sources coupled to the printed circuit board;
        a plurality of light guides adjacent to the plurality of light sources and configured to be illuminated by the plurality of light sources; and
        a dispensing area defined by a rear wall, a bottom wall and sidewalls of the dispenser, the plurality of light guides providing illumination to the dispensing area, wherein the fascia is directly coupled to the spout; and the printed circuit board is located behind the fascia so that the printed circuit board is not visible to a user of the refrigerator.

2. The refrigerator of claim 1, wherein the printed circuit board is coupled to an upper portion of the spout.

3. The refrigerator of claim 2, wherein the printed circuit board is directly coupled to the upper portion of the spout.

4. The refrigerator of claim 1, wherein the fascia includes a first light guide hole, the spout includes a second light guide hole and at least one of the plurality of light guides passes through the first and second light guide holes.

5. The refrigerator of claim 1, wherein at least one of the plurality of light guides constitutes a first light guide, the first light guide being coupled to the spout.

6. The refrigerator of claim 5, wherein the first light guide extends from a top of the spout to the bottom of the spout, with a front face of the first light guide being visible to a user of the refrigerator.

7. The refrigerator of claim 5, wherein at least one of the plurality of light guides constitutes a second light guide, the second light guide being coupled to the fascia.

8. The refrigerator of claim 7, wherein the fascia includes a light guide hole and the second light guide is located in the light guide hole so that, when the second light guide is illuminated, light is emitted in a downward direction from the fascia into the dispensing area.

9. A refrigerator comprising: at least one refrigerated compartment selectively sealed by a door; and a dispenser provided in the door, said dispenser including: a housing assembly having a fascia and a spout, the spout being located so that a dispensed substance passes through the spout when the dispenser is activated; a printed circuit board coupled to the housing assembly, wherein the printed circuit board is located above the spout and behind the fascia so that the printed circuit board is not visible to a user of the refrigerator; a plurality of light sources coupled to the printed circuit board; a plurality of light guides adjacent to the plurality of light sources and configured to be illuminated by the plurality of light sources; and a dispensing area defined by a rear wall, a bottom wall and sidewalls of the dispenser, the plurality of light guides providing illumination to the dispensing area.

10. A dispenser for a refrigerator comprising:
a housing assembly having a fascia and a spout, the spout being located so that a dispensed substance passes through the spout when the dispenser is activated;
a printed circuit board coupled to the housing assembly;
a plurality of light sources coupled to the printed circuit board;
a plurality of light guides adjacent to the plurality of light sources and configured to be illuminated by the plurality of light sources; and
a dispensing area defined by a rear wall, a bottom wall and sidewalls of the dispenser, the plurality of light guides providing illumination to the dispensing area, wherein at least one of the plurality of light guides constitutes a first light guide, the first light guide being directly coupled to the spout.

11. The dispenser of claim 10, wherein the printed circuit board is located behind the fascia so that the printed circuit board is not visible to a user of the dispenser.

12. The dispenser of claim 11, wherein the printed circuit board is coupled to an upper portion of the spout.

13. The dispenser of claim 12, wherein the printed circuit board is directly coupled to the upper portion of the spout.

14. The dispenser of claim 11, wherein the fascia is directly coupled to the spout.

15. The dispenser of claim 14, wherein the fascia includes a first light guide hole, the spout includes a second light guide hole and at least one of the plurality of light guides passes through the first and second light guide holes.

16. The dispenser of claim 10, wherein the first light guide extends from a top of the spout to the bottom of the spout, with a front face of the first light guide being visible to a user of the dispenser.

17. The dispenser of claim 10, wherein at least one of the plurality of light guides constitutes a second light guide, the second light guide being coupled to the fascia.

18. The dispenser of claim 17, wherein the fascia includes a light guide hole and the second light guide is located in the light guide hole so that, when the second light guide is illuminated, light is emitted in a downward direction from the fascia into the dispensing area.

19. A method of illuminating a dispenser of a refrigerator, the dispenser including a housing assembly having a fascia and a spout, a printed circuit board coupled to the housing assembly, a plurality of light sources coupled to the printed circuit board, a plurality of light guides adjacent to the plurality of light sources and configured to be illuminated by the plurality of light sources and a dispensing area defined by a rear wall, a bottom wall and sidewalls of the dispenser, the spout being located so that a dispensed substance passes through the spout when the dispenser is activated, wherein at least one of the plurality of light guides constitutes a first light guide, the first light guide being directly coupled to the spout, the method comprising:

illuminating the plurality of light guides with the plurality of light sources to provide illumination to the dispensing area.

20. The method of claim 19, wherein the plurality of light guides includes a second light guide coupled to the fascia, and wherein illuminating the plurality of light guides with the plurality of light sources to provide illumination to the dispensing area includes emitting light from a front face of the first light guide and emitting light in a downward direction from the second light guide.

* * * * *